Nov. 5, 1957     J. E. DUCKRO     2,812,051
SAFETY DEVICE FOR MOVABLE BELT ASSEMBLIES
Filed Aug. 19, 1954

INVENTOR.
JOHN E. DUCKRO
BY
HIS ATTORNEYS

United States Patent Office 2,812,051
Patented Nov. 5, 1957

2,812,051

SAFETY DEVICE FOR MOVABLE BELT ASSEMBLIES

John E. Duckro, Dayton, Ohio, assignor to Louis R. Mahrt and D. Robert Laughter, as trustees for Standard Dayton Corporation, Dayton, Ohio, a corporation of Ohio Application August 19, 1954, Serial No. 450,893

1 Claim. (Cl. 198—105)

This invention relates to a safety device for movable belt assemblies. The invention relates more particularly to a safety device for conveyor belt assemblies. However, the invention is not so limited in that it may be used in other types of mechanical assemblies.

Many types of conveyor belt assemblies are used in locations in which a person's hand frequently comes into contact with the moving conveyor belt. In some types of retail places of business check-out counters are used which are associated with a continuous moving belt unit upon which groceries or other articles are positioned by the customer. The groceries are moved by the conveyor belt toward an employee of the store who records the price of each article and moves the article from the end of the conveyor belt unit to a location adjacent the end of the conveyor belt unit.

There are also various other types of business and industry which employ conveyor belt assemblies in which a person's hand frequently comes into contact with the conveyor belt as articles are placed upon the conveyor belt or are withdrawn therefrom. One of the locations or positions in which many accidents occur in the conventional type of conveyor belt assembly is the location at the end of a conveyor unit. In some types of belt assemblies there is a space between the end of the conveyor belt unit and an adjacent aligned conveyor belt unit. In other types of assemblies there is a space between the end of a conveyor belt unit and a platform or shelf in alignment with the conveyor belt unit and adjacent the end thereof. This space exists due to the fact that it is not practical to position a conveyor belt unit so close to another unit that there is frictional engagement between the two. Therefore, an appreciable space exists between a conveyor belt unit and other units of a conveyor belt assembly. A person's hands or fingers may inadvertently be carried by the conveyor belt into this space. In this manner a person may be severely injured.

Hence, an object of this invention is to provide a safety device for use within the dangerous space between the end of a conveyor belt unit and other members of the assembly.

Another object of the invention is to provide a safety device for conveyor belt assemblies which, in addition to protecting a person who may come in contact with a moving belt, also aids in movement of an article from a conveyor belt unit to another unit of the assembly.

Another object of the invention is the provision of a mechanism for a conveyor belt assembly which aids in discharging flat flexible objects from the end of the belt unit by repelling such articles from the belt unit at the end thereof rather than permitting the belt to further carry such objects.

Another object of the invention is the provision of a mechanism for conveyor belt assemblies which aids in movement of merchandize at the end of the belt to another unit of the assembly while permitting discharge of debris from the assembly.

Another object of the invention is to provide a mechanism for conveyor belt assemblies which prevents tall slender objects from tipping as such objects pass from the conveyor belt to a surface at the end of the belt.

Other objects and advantages reside in the construction of parts, the combination thereof and the mode of operation, as will become more apparent from the following description.

Figure 1:
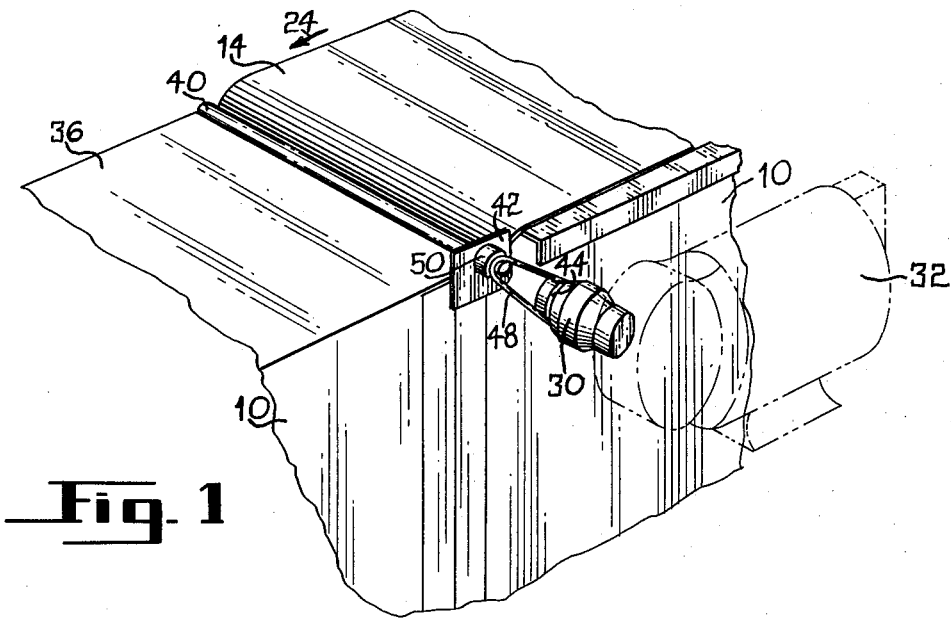
Figure 1 is a fragmentary perspective view showing a safety device of this invention attached to a conveyor belt assembly.
Figure 2:
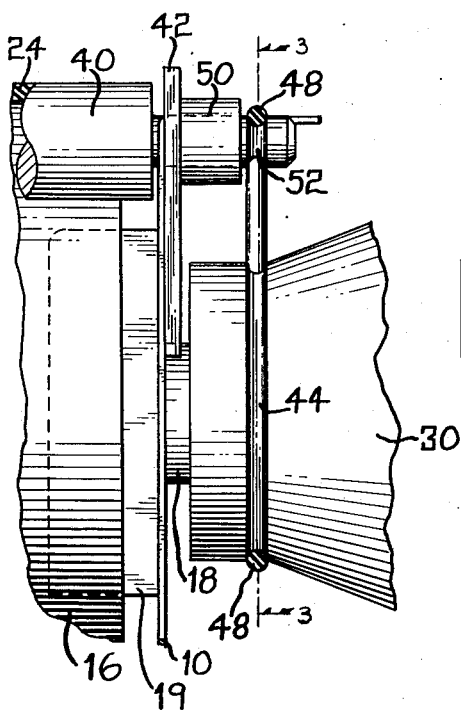
Figure 2 is an enlarged fragmentary longitudinal view showing an end of the safety device of this invention and the manner in which the safety device may be attached to a coveyor belt drive unit for operation thereby.

Referring to the drawing in detail, a typical conveyor belt assembly in which the safety device of this invention is employed includes a support structure 10. A conveyor belt unit supported by the support structure 10 comprises an endless movable conveyor belt 14. The conveyor belt 14 is partially supported by an elongate cylindrical belt roll 16, which is carried by a shaft 18 journalled in a bearing 19. The bearing 19 is mounted upon the support structure 10. The roll 16 determines the end of the conveyor belt unit in that the direction of movement of the conveyor belt 14 is reversed by the roll 16 as the belt 14 moves arcuately around the axis of rotation of the roll 16.

Figure 3:
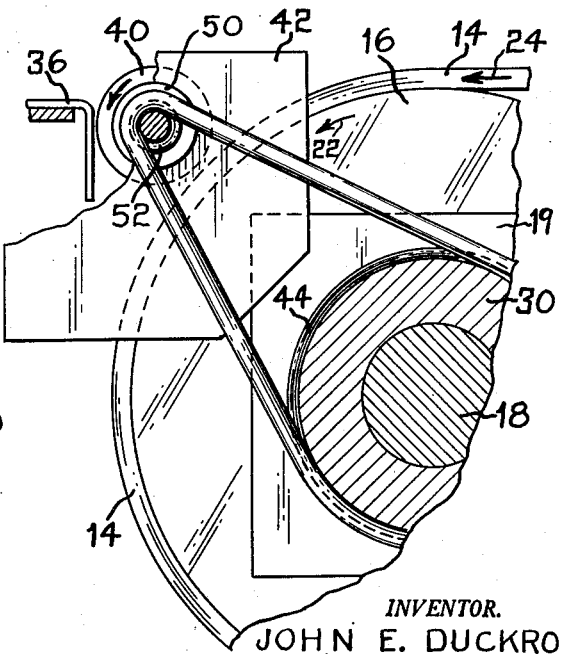
Figure 3 is a section view taken substantially on line 3—3 of Figure 2.

The direction of rotation of the roll 16, which is carried by the shaft 18, is in the direction as shown by an arrow 22 in Figure 3. Thus, the direction of movement of the belt 14 is in accordance with the direction of an arrow 24 shown in Figures 1 and 3.

The shaft 18 may be a driving shaft for the movable belt 14 or the shaft 18 may be an idler shaft, being driven by the belt 14. If the shaft 18 is used as a driving member for the belt 14, a coupling, such as coupling 30, may be attached between the shaft 18 and a motor unit, such as motor unit 32. As the motor unit 32 drives the belt 14 in the direction as indicated by the arrow 24, the belt 14 may be employed to carry articles to a platform or shelf member 36.

Ordinarily, by necessity, there is an appreciable clearance between the belt 14, as it engages the roll 16, and the shelf member 36. The clearance between the roll 16 and the shelf 36 is maintained at a very small amount in order that articles may freely and readily move from the belt 14 to the shelf 36 as the roll 16 rotates. However, it is ordinarily found that this opening between the shelf 36 and the roll 16 is approximately large enough to receive a person's fingers if they should be inadvertently placed between the roll 16 and the shelf 36. A person's fingers may become severely injured by the movement of the belt 14 carrying the fingers between the roll 16 and the shelf 36.

In this invention means are provided for preventing a person's fingers from being caught accidentally or otherwise between the roll 16 and the shelf 36. This safety device also makes possible freer movement of articles from the belt 14 to the shelf 36. The safety device comprises an elongate cylindrical rod member 40 which is rotated in the same direction of rotation as the roll 16. The rod member 40 is positioned between the roll 16 and the shelf 36 and is rotatably supported by any suitable means, such as by a bearing plate 42, at each end thereof. Each bearing plate 42 is attached to the support structure 10 retaining the rod member 40 in substantially parallel relation with respect to the roll 16.

The rod member 40 may be rotated by any suitable means. Herein the coupling 30 is shown as serving as means for rotation of the rod member 40. The coupling 30 is provided with an annular groove 44 adapted to receive a comparatively small drive belt 48 having a circular cross section. The rod member 40 is provided with a shaft extension member 50 within which is formed an annular groove 52 adjacent the end thereof. The drive belt 48 is positioned in the groove 44 of the coupling 30 and within the groove 52 of the shaft extension 50. Thus, the drive belt 48 operably joins the rod member 40 to the coupling 30. Therefore, with rotation of the shaft 18 as the belt 14 is movably driven, the rod member 40 also rotates in the same direction of rotation.

The peripheral speed of the rod member 40, as it is rotated with the rotation of the roll 16, may be greater, or less, or equal to, the peripheral speed of the conveyor belt 14 as the conveyor belt 14 is operably moved by rotation of the roll 16. However, it has been found that the most suitable peripheral speed of the rod 40 as a protective means in this invention is higher than the peripheral speed of the belt 14.

As the belt 14 operably moves, the rod member 40 is rotated so that if bodily members or clothing become positioned upon the conveyor belt 14 as the conveyor belt 14 contacts the roll 16, it is impossible for the bodily members such as hands or fingers or clothing to be caught by the belt 14 and carried into the opening between the roll 16 and the shelf 36. The rotation of the rod member 40 as it is positioned between the roll 16 and the shelf 36 repels objects away from the belt 14 so that there is no opportunity for such objects to be caught between the roll 16 and the shelf 36.

It may be understood that the rod member 40 may be rotatively driven by any suitable means. The rod 40 need not be rotatively driven directly from the coupling member 30 but may be driven by a separate external means or from any other roll which movably carries the belt 14. It is only necessary that means be provided for rotatively driving the rod 40 in the same direction as the rotation of the shaft 18. The rod member 40 may be composed of any suitable material.

It is to be understood that the shelf 36 adjacent the belt 14 may be replaced by another moving belt unit or by other types of receiving units. Thus, articles may be moved by one conveyor belt to another conveyor belt or to any other type of receiving unit. The same problem exists regardless of the type of receiving unit adjacent the belt unit. This is due to the fact that by necessity a space exists between the belt and the receiving unit. A person's fingers may be carried into this space by the moving belt. The safety device of this invention prevents the belt from carrying a person's fingers into the space. Thus, no injury from such cause may result.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

In a check-out counter for retail merchandising of the type provided with a horizontal endless movable conveyor belt, a rotatable horizontally disposed roll member supporting the belt, a horizontal shelf member disposed adjacent the roll member, the shelf member being positioned in substantial alignment with the upper surface of the conveyor belt, there being a small space between the belt and the shelf member, the combination comprising a safety device including a cylindrical rod member rotatably positioned in the space between the belt and the shelf member, the rod member having a diameter equal to less than one-fifth the diameter of the roll member, the rod member being positioned with respect to the belt so that a plane passing through the upper surface of the belt also intersects the rod member, the upper surface of the rod member being in a plane at least as high as the upper surface of the shelf member, the rod member being provided with an axial extension having an annular peripheral groove therein, the roll member having an axial extension of smaller diameter than the diameter of the roll member, the axial extension having an annular peripheral groove therein, and a belt within the annular grooves of the rod member and the roll member connecting the rod member to the roll member for operation of the rod member with rotation of the roll member in the same direction as the direction of rotation of the roll member.

References Cited in the file of this patent

UNITED STATES PATENTS

| 36,121 | Wise | Apr. 5, 1862 |
| 1,686,519 | Cutler | Oct. 9, 1928 |
| 1,737,829 | Cosgrove | Dec. 3, 1929 |
| 2,234,465 | Carroll | Mar. 11, 1941 |
| 2,235,941 | Montgomery | Mar. 25, 1941 |
| 2,317,438 | Bradley | Apr. 27, 1943 |
| 2,335,043 | Cahoon | Nov. 23, 1943 |
| 2,338,359 | Sharp | Jan. 4, 1944 |
| 2,536,961 | Smith | Jan. 2, 1951 |
| 2,624,444 | Casabona | Jan. 6, 1953 |
| 2,724,486 | Hatch et al. | Nov. 22, 1955 |

FOREIGN PATENTS

| 690,858 | Great Britain | Aug. 30, 1951 |